No. 859,708. PATENTED JULY 9, 1907.
E. WAKEFIELD.
AQUATIC STAGE.
APPLICATION FILED APR. 6, 1907.
2 SHEETS—SHEET 1.
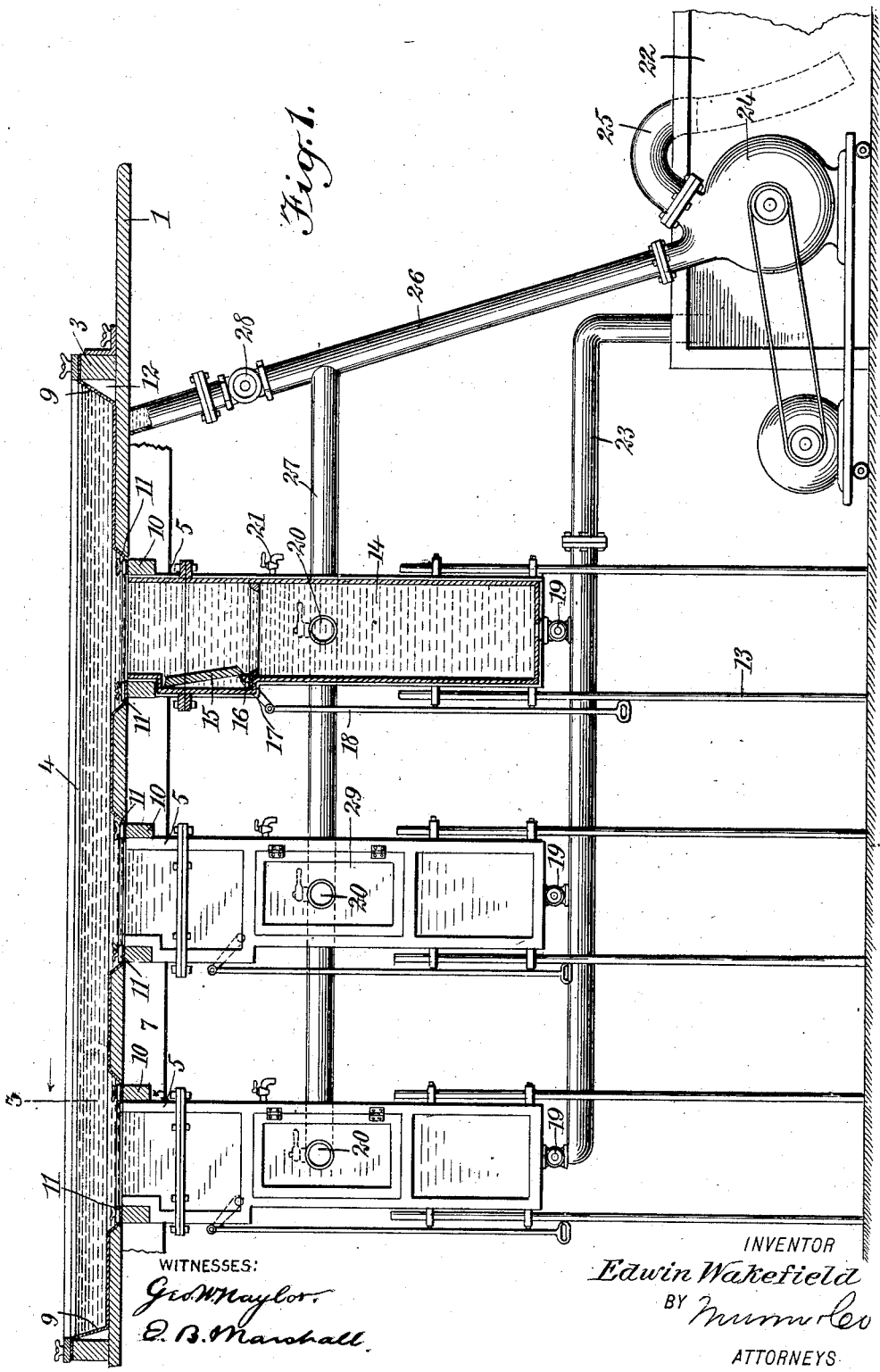
WITNESSES:
INVENTOR
Edwin Wakefield
BY
ATTORNEYS No. 859,708. PATENTED JULY 9, 1907.
E. WAKEFIELD.
AQUATIC STAGE.
APPLICATION FILED APR. 6, 1907.
2 SHEETS—SHEET 2.
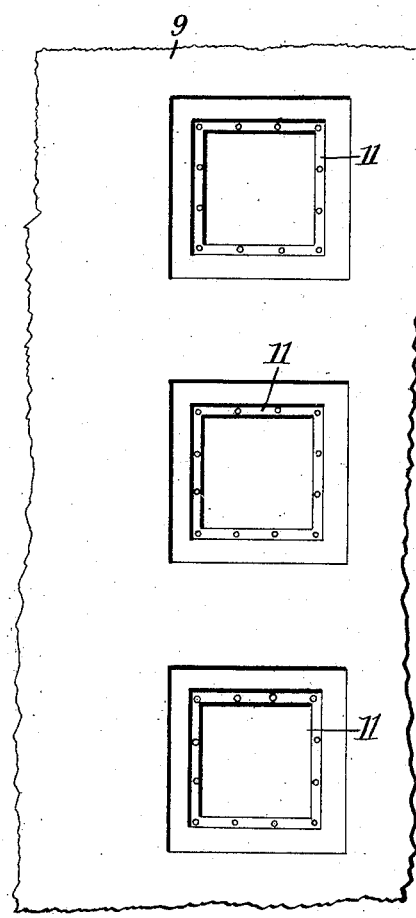
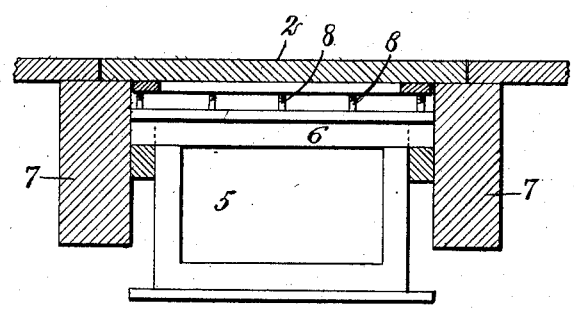
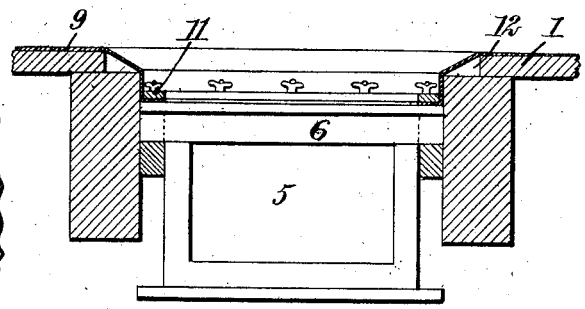
WITNESSES
INVENTOR
Edwin Wakefield
BY Munn & Co
ATTORNEYS.

UNITED STATES PATENT OFFICE.

EDWIN WAKEFIELD, OF NEW YORK, N. Y.

AQUATIC STAGE.

No. 859,708.

Specification of Letters Patent.

Patented July 9, 1907.

Application filed April 6, 1907. Serial No. 366,754.

*To all whom it may concern:*

Be it known that I, EDWIN WAKEFIELD, a citizen of the United States, and a resident of the city of New York, borough of Manhattan, in the county and State of New York, have invented new and useful Improvements in Aquatic Stages, of which the following is a full, clear, and exact description.

My improvement relates to aquatic stages, and has for its principal object to provide an aquatic stage which can be quickly erected on the stage of any theater without disfiguring it or making it impossible to use the stage in the ordinary way at a few minutes notice. It is therefore possible with my invention to have an aquatic scene in one act of a play while the remainder of the scenes may be on the permanent stage with the usual scenery, etc.

Another object of my invention is to provide compartments below the aquatic stage, but in connection therewith, into which performers may disappear beneath the water.

A third object of the invention is to provide the compartments with valves and doors, by which communication with the aquatic stage may be cut off and the water may be let out or may be pumped into the compartment and air may be let in or out of the upper portion of the compartment, as the water is let out or pumped in.

Still another object of my invention is to provide a pump in connection with pipes in communication with the aquatic stage and the compartments, by which the water can be pumped therein and the height thereof controlled.

In the drawings is shown one embodiment of my invention which is described in this specification, but I do not limit myself thereto, as I consider myself entitled to all forms and embodiments of the invention which may fall within the scope of the appended claims.

Reference is to be had to the accompanying drawings forming a part of this specification, in which similar characters of reference indicate corresponding parts in all the figures.

Figure 1 is a front elevation of the aquatic stage erected on the stage of a theater, with portions in section; Fig. 2 is a fragmentary view of the aquatic stage, showing the openings to the compartments below; Fig. 3 is a sectional view on an enlarged scale, on the line 3—3 of Fig. 1, with the trap-doors of the stage closed; and Fig. 4 is a sectional view, the same as shown in Fig. 3, but with the trap-doors taken away and the canvas of the aquatic stage secured in place.

The theater stage is represented at 1 and is constructed in the usual way with one or more trap-doors 2, which may be readily removed. On the stage are assembled curb members 3 to form an inclosure or stage tank, 4. The curb members are rigidly secured to the theater stage and are rigidly held in place. It is also advisable to make the curb members so that they will interlock with each other, to insure greater strength. Below the trap doors 2 are secured enlarged conduits 5 which are adapted to afford communication with the compartments below the theater stage. These enlarged conduits are shown secured to hangers 6 which are supported by the beams 7 of the theater. When the trap door 2 is used to close the passage to the conduit, props 8 may be used to stiffen the trap door 2 and render it firm. After the curb members 3 have been assembled to form the inclosure or stage tank, 4, canvas or other water-tight material 9 is used to cover the inclosure, the said canvas having openings which are adapted to register with the openings covered by the trap doors, the said canvas at the openings therein being adapted to extend beyond the extremities of the openings covered by the trap doors, which will admit of the canvas being secured to the members 10, which extend all around the enlarged conduits 5 and are secured thereto and to the theater beams 7. The canvas 9 may be secured to the members 10 and the curb members 3 by stretching it thereover and by fastening it with screws 11, with gaskets thereunder, which are screwed down on the edges of the canvas.

The joints between the enlarged conduits 5 and the surrounding members are calked to make them watertight. In order to insure strength and safety, gussets 12 may be inserted under the canvas where it assumes an angular position. Under the theater stage are standards 13 which support the compartments 14 which register with the enlarged conduits 5 and are secured thereto by bolting the flanges on the upper extremities of the compartments to the flanges on the enlarged conduits, gaskets being used to make the connection water-tight. Near the upper extremities of the compartments are water-tight doors 15 which are secured to a rock shaft 16, one end of which extends beyond the compartment and is operated by an arm 17 to which a rod 18 is pivoted. By this means the water-tight doors 15 may be operated from without the compartments. The said compartments 14 are also watertight and are constructed with their fronts of glass so that the operators may see therein; they are also provided with water outlet valves 19 and water inlet valves 20; also with air cocks 21. In connection with the aquatic stage, there is a pumping device or other means for forcing water up to the level of the top of the curb of the aquatic stage.

When the water pressure is great enough, no pump is required, but in the drawings I have shown a tank 22 with which an outlet pipe 23 communicates, this outlet pipe 23 being connected to the lower extremities of the compartments 14, the connections being commanded by the valves 19. The pump 24 is adapted to draw the water from the tank 22 through the pipe 25 and force it through the pipe 26 up into the stage tank 4 and into the compartments 14, through the branch 27. The direction of the inflowing water is commanded by the valves 20 and a valve 28. In the front of the compartments 14, are water-tight doors 29 which have their principal surface of glass and are pivoted at one side of the body of the compartments.

When the apparatus is assembled, as shown in the drawings and as hereinbefore described, the valve 28 is opened and the water-tight doors 15 and the valves 20 are closed. The water is then pumped into the stage tank 4 until it, as well as the enlarged conduits 5 and the portions of the compartments 14 which are above the water-tight doors 15, are filled, when the valve 28 is closed and the lower portions of the compartments 14 are filled with water by opening the valves 20 and operating the pump. If the water-tight doors 15 are now opened, a performer on the stage may disappear down through the enlarged conduit and the upper portion of the compartment 14 into the lower portion thereof, when the water-tight doors 15 may be closed.

During the time the performer is in one of the compartments, he may be observed at all times by one of the operators so that there is no danger of his drowning. When the operator wishes to have it appear to the audience that the performer has drowned, the valve 19 and the cock 21 are opened after the performer has descended from the stage tank and has entered the compartment and the water-tight door 15 has been closed. The water then escapes from the compartment when the door 29 is opened and the performer can leave the compartment. To enable it to appear that the performer comes from a great depth of water, the water-tight door 15 is closed and the valve 19 and cock 21 are opened until the water in the compartment is below the level of the sill of the doorway thereof, when the performer may enter the compartment through the door. The valve 19 is then closed and the valve 20 is opened and the water is forced therethrough. After the water reaches the height of the cock 21, it is closed and when the compartment is nearly full of water the water-tight door 15 is opened, and the performer may move through the upper portion of the compartment and the enlarged conduit 5 to the stage tank. The enlarged conduits 5 may be permanently fastened to the theater stage and the remainder of the apparatus may be packed and shipped from theater to theater, where similar enlarged conduits are installed.

The compartments 14 are adjustable at different heights on the standards 13 so that the apparatus may be used in different connections.

With my apparatus, many interesting and unusual performances may be given on the ordinary theater stage.

Having thus described my invention, I claim as new and desire to secure by Letters Patent:

1. An aquatic stage, consisting of a stage tank which may be filled with water, a compartment in communication therewith, a door which is adapted to command said communication, a door in the compartment, and means for filling and emptying the compartment of water.

2. An aquatic stage, consisting of a stage tank which is adapted to be filled with water, a compartment in communication therewith, a door which is adapted to command said communication, a door in the compartment, a pipe affording a means to fill the compartment with water and a second pipe affording a means to empty the compartment, the said pipes being commanded by valves respectively.

3. An aquatic stage, consisting of a stage tank, a theater stage on which the stage tank may be assembled, a trap door in the theater stage which may be removed, an enlarged conduit secured to the beams supporting the theater stage and which registers with the opening in the stage made by the removal of the trap door, a compartment adapted to be secured to the said enlarged conduit, a door in the compartment which is adapted to close communication between the enlarged conduit and the principal portion of the compartment, a second door which is adapted to afford communication between the compartment and the theater and means to fill and empty the compartment of water.

4. An aquatic stage, consisting of a stage-tank within view from the seats in the auditorium of the theater, a compartment hidden from the view of persons in the auditorium, a conduit affording communication between the stage-tank and the compartment and a door adapted to command said communication.

5. An aquatic stage, consisting of a stage-tank within view from the seats in the auditorium of the theater, a compartment hidden from the view of persons in the said auditorium, a conduit affording communication between the stage-tank and the compartment, a door adapted to close communication between the stage-tank and the principal portion of the compartment, and means to fill and empty the principal portion of the compartment of water.

6. An aquatic stage, consisting of a stage-tank within view from the seats in the auditorium of the theater, the said stage-tank being adapted to hold water, a compartment hidden from the view of persons in the said auditorium, the said compartment being in communication with the stage-tank, a door commanding the said communication, means to withdraw water from the compartment, and a door in the compartment, affording communication between the compartment and the theater.

7. An aquatic stage, consisting of a stage-tank within view from the seats in the auditorium of the theater, means to fill the tank with water, a compartment hidden from the view of persons in the said auditorium, the said compartment having a glass front and being in communication with the stage tank, a door commanding the said communication, means to fill and empty the compartment of water, and a door in the compartment which affords communication between the compartment and the theater.

8. An aquatic stage, consisting of a stage tank which is within view from the auditorium of the theater, a compartment that is hidden from the view of persons in the auditorium, the said compartment being in communication with the stage tank, a door commanding the said communication, a door in the compartment affording communication between the compartment and the theater, a pump which is adapted to fill the stage tank and the compartment with water, and an outlet pipe commanded by a valve which is adapted to drain the water from the compartment.

9. An aquatic stage, consisting of a theater stage, curb members assembled thereon to form a tank, a trap door in the stage which is removable, an enlarged conduit rigidly secured to the opening in the theater stage made by the removal of the trap door, a waterproof material which is used to line the tank and which has an opening which registers with the opening in the theater stage, the edges of the waterproof material around said opening being secured to the opening in the theater stage and made water-tight, a compartment secured to the enlarged conduit and means to command the communication between the compartment and the conduit.

10. An aquatic stage, consisting of a theater stage, curb members assembled thereon to form a tank, a trap door in the theater stage which is removable, an enlarged conduit rigidly secured to the opening in the theater stage made by the removal of the trap door, a waterproof material which is used to line the tank and which has an opening which registers with the opening in the theater stage, the edges of the waterproof material around said opening being secured to the opening in the theater stage and the joint made water-tight, a compartment secured to the enlarged conduit, a door commanding the communication between the enlarged conduit and the principal portions of the compartment, a door affording communication between the compartment and the theater, and means to fill and empty the compartment of water.

11. An aquatic stage, consisting of a theater stage, curb members assembled thereon to form a tank, a trap door in the theater stage which is removable, an enlarged conduit secured to the theater stage and which registers with the opening therein made by the removal of the trap door, a waterproof material which is used to line the tank and which has an opening which registers with the opening in the theater stage, the edges of the waterproof material around said opening being secured to the opening in the theater stage and the joint made water-tight, a compartment secured to the enlarged conduit, a door commanding the communication between the enlarged conduit and the principal portion of the compartment, a door affording communication between the compartment and the theater, a pump with connections to fill the tank and the compartment, respectively, with water, valves in the said connections, and an outlet pipe commanded by a valve by which the compartment may be emptied of its water.

12. An aquatic stage, consisting of curb members, assembled on a theater stage to form a tank thereon, a water-proof material, which is used to line the said tank, the said water-proof material having an opening which registers with a trap door in the theater stage and a compartment which is secured to the border of the trap door opening, the said compartment having a door which is adapted to command the communication between the trap-door and the body of the compartment.

13. An aquatic stage, consisting of curb members which are assembled on the theater stage to form a tank, a water-proof material which is used to line the tank, the said water-proof material having an opening edges of which are secured to the border of the opening formed by the removal of a trap-door in the stage, a compartment which is secured to the border of the said opening, a door commanding the communication between the compartment and the trap-door, and a door in the compartment affording communication between the said compartment and the theater.

14. An aquatic stage, consisting of curb members which are assembled on a theater stage to form a tank thereon, a water-proof material which is used to line the said tank, the said water-proof material having an opening the edges of which are secured to the edges of the opening in the stage caused by the removal of the trap-door, a compartment which is secured to the under side of the trap-door, a door which is adapted to command the communication between the said compartment and the tank, and a door in the compartment which affords communication between the compartment and the theater.

15. An aquatic stage, consisting of curb members which are assembled on a stage to form a tank thereon, a waterproof material which is used as a lining for the tank, an opening in the water-proof material, the edges of which are secured to the border of the opening in the stage caused by the removal of a trap-door, a compartment under the stage which is secured to the border of the opening in the stage, a door commanding the communication between the compartment and the tank, a door in the compartment which affords communication between it and the theater, and means for emptying the compartment of water.

In testimony whereof I have signed my name to this specification in the presence of two subscribing witnesses.

EDWIN WAKEFIELD.

Witnesses:
DANIEL LANG,
SAMUEL RISENSLOUS.